United States Patent [19]

Sinclair

[11] Patent Number: 4,659,040

[45] Date of Patent: Apr. 21, 1987

[54] AIRCRAFT UNDERCARRIAGE ASSEMBLIES

[76] Inventor: Graham R. Sinclair, 18 Marie Street, Murarrie, Queensland, Australia

[21] Appl. No.: 700,882

[22] PCT Filed: May 14, 1984

[86] PCT No.: PCT/AU84/00085

§ 371 Date: Jan. 14, 1985

§ 102(e) Date: Jan. 14, 1985

[87] PCT Pub. No.: WO84/04505

PCT Pub. Date: Nov. 22, 1984

[30] Foreign Application Priority Data

May 12, 1983 [AU] Australia .............................. PF9305
May 16, 1983 [AU] Australia .............................. PF9356

[51] Int. Cl.[4] ...................... B64C 25/40; B64C 25/42; B64C 25/50

[52] U.S. Cl. ................................ 244/103 S; 244/111

[58] Field of Search ........... 244/100 R, 102 R, 103 R, 244/103 S, 110 A, 111, 50; 180/16, 71.5, 354

[56] References Cited

U.S. PATENT DOCUMENTS

| | | | |
|---|---|---|---|
| 1,451,117 | 4/1923 | Rounds | 244/103 R |
| 2,222,695 | 11/1940 | Velo | 192/3.5 |
| 2,389,525 | 11/1945 | Manheim, Sr. | 244/103 S |
| 2,460,387 | 2/1949 | Hunter | 244/50 |
| 2,503,755 | 4/1950 | Martin et al. | 244/50 |
| 2,644,654 | 7/1953 | Mercier | 244/103 R |
| 2,851,231 | 9/1958 | Westcott, Jr. | 244/103 R |
| 2,904,136 | 9/1959 | Greenough | 244/111 |
| 2,911,168 | 11/1959 | Moreland | 244/50 |
| 2,925,968 | 2/1960 | Sharples | 244/102 R |
| 2,930,552 | 3/1960 | Hartel | 244/103 R |
| 2,943,820 | 7/1960 | Westcott, Jr. | 244/50 |
| 3,133,717 | 5/1964 | Hartel | 244/103 R |
| 4,061,294 | 12/1977 | Hawkins | 244/103 S |

FOREIGN PATENT DOCUMENTS

| | | | |
|---|---|---|---|
| 140067 | 11/1948 | Australia | 244/103 R |
| 30696 | 1/1973 | Australia . | |
| 2215165 | 1/1973 | Fed. Rep. of Germany . | |
| 1544174 | 9/1968 | France | 244/103 R |
| 560316 | 3/1944 | United Kingdom . | |

*Primary Examiner*—Galen L. Barefoot
*Assistant Examiner*—Rodney Corl
*Attorney, Agent, or Firm*—Schwartz, Jeffery, Schwaab, Mack, Blumenthal & Evans

[57] ABSTRACT

An aircraft undercarriage assembly (10) has an undercarriage truck (15) where the pair of rear wheels (25) are mounted on a rear support member (20) pivotally movable relative to the front support member (16) when the aircraft is taxiing to provide a steering effect, but lockable in alignment with the front wheel·pair (24) during flight. Each pair of wheels (24, 25) has one wheel (37) connected to the respective axle (22, 23) the wheel (37) having turbine-like spokes (39) which receive air directed by a vental airscoop (45) to spin the wheel (37) upto speed. A clutch assembly (55) then operatively connects the second wheel (49) to the respective axle (22, 23) to enable that wheel (49) to spin upto speed. The wheels (37, 49) are independently braked by respective brake disc/friction disc pairs (61, 64, 68, 70) engaged by brake pistons (67, 71) on the respective axle housing (17, 21).

5 Claims, 4 Drawing Figures

AIRCRAFT UNDERCARRIAGE ASSEMBLIES

BACKGROUND OF THE INVENTION

1. Field of the Invention

This invention relates to aircraft undercarriage assemblies. In particular the invention relates to braking and steering systems for such assemblies.

2. Brief Description of the Prior Art

In my earlier International Application No. PCT/AU82/00130 filed on the Aug. 13th, 1982 (13-08-82) and published under International Publication No. WO83/01239 there is described an aircraft landing wheel rotating assembly which rotates the landing wheels prior to touchdown to reduce the incidence of "flat spots" on the tyres. The assembly includes an airscoop which directs air through "turbine-blade" like spokes in the wheels, the airscoop being vented to reduce drag when the undercarriage is first lowered prior to landing and on take-off.

This assembly has generally proved to be effective. However, in certain applications, the high inertia of the aircraft wheels has resulted in an unacceptably long "spin-up" time when the air is directed through the wheels and the drag generated by the airscoop is high.

On larger aircraft, i.e. those with four wheel truck-type undercarriages, the large airscoop for the front pair of wheels may mask the airscoop for the rear set of wheels, reducing the efficiency of the latter.

In addition, the tyres on the undercarriages undergo considerable "scrubbing" when the aircraft turn about a short radius during taxiing.

SUMMARY OF THE INVENTION

It is an object of the present invention to provide a means for selectively bringing the aircraft wheels upto speed to minimise the inertial effects.

It is a preferred object to provide such a means where a small compact airscoop, having even less drag than of my existing airscoop, may be used.

It is a further preferred object to provide such a means where the aircraft brakes are placed adjacent one of the pair of wheels in the airstream for maximum efficiency.

It is a still further preferred object to provide a steering mechanism for an aircraft undercarriage to reduce tyre wear due to scrubbing during turning when an aircraft is taxiing.

In one aspect the present invention relates to a braking assembly for aircraft or other vehicles including:

a stationary axle housing;

an axle rotatably mounted in the housing;

a first ground-engaging wheel operatively connected to the axle;

a second ground-engaging wheel rotatably mounted on the axle;

a clutch means operable to releasably connect the second wheel to the axle;

first brake means on the housing operably connectable to the axle to provide braking for the first wheel; and second brake means on the housing operably connectable to the second wheel to provide braking for the second wheel.

In a second aspect, the present invention relates to an aircraft undercarriage assembly including:

a support leg or strut extendable from an aircraft;

a stationary axle housing at or adjacent the lower end of the support leg or strut; and the braking means hereinbefore described.

Preferably the first wheel has turbine like spokes interconnecting the tyre-mounting rim to a hub fixed to the axle. Preferably an airscoop of the type described in International Application No. PCT/AU82/00130 is mounted on the axle housing adjacent the first wheel to direct air through the spokes to enable the first wheel to be spun-up to speed before landing.

Preferably the clutch means includes a mechanical clutch, fluid coupling or torque convertor operable to selectively engage the second wheel with the axle.

Preferably the first and second braking means are mounted on the axle housing adjacent the second wheel.

In a third aspect the present invention resides in an aircraft undercarriage assembly including:

an undercarriage support leg or strut;

a front axle support member pivotally mounted on the support leg or strut for limited movement in the vertical plane;

a front axle, with ground-engaging wheels, on the front axle support member;

a rear axle support member pivotally mounted on the front axle support member for movement about a substantially vertical axis, the rear axle being movable relative to the support leg in a substantially vertical plane;

a rear axle, with ground engaging wheels, on the rear axle support member, so arranged that, during taxiiing, the rear axle support member is pivotally movable to provide steering for the rear wheels relative to the front wheels but that during flight, the rear axle support member is engageable with the support leg or the front axle support member to lock the rear wheels in alignment with the front wheels.

Preferably a housing is provided at the lower end of the support leg or strut and stop means are provided to limit the pivotal movement of the rear axle support member relative to the front axle support member.

Preferably a channel, slot or groove is provided at the rear of the housing for engagement by the rear axle support member to lock the rear wheels in alignment with the front wheels.

Preferably a hydraulic ram or spring means is provided on the support leg or strut in engagement with the front axle support member to cause the undercarriage to be tilted so that the rear axle support member is urged into engagement with the channel, slot or groove,

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figures 1, 2, 3:
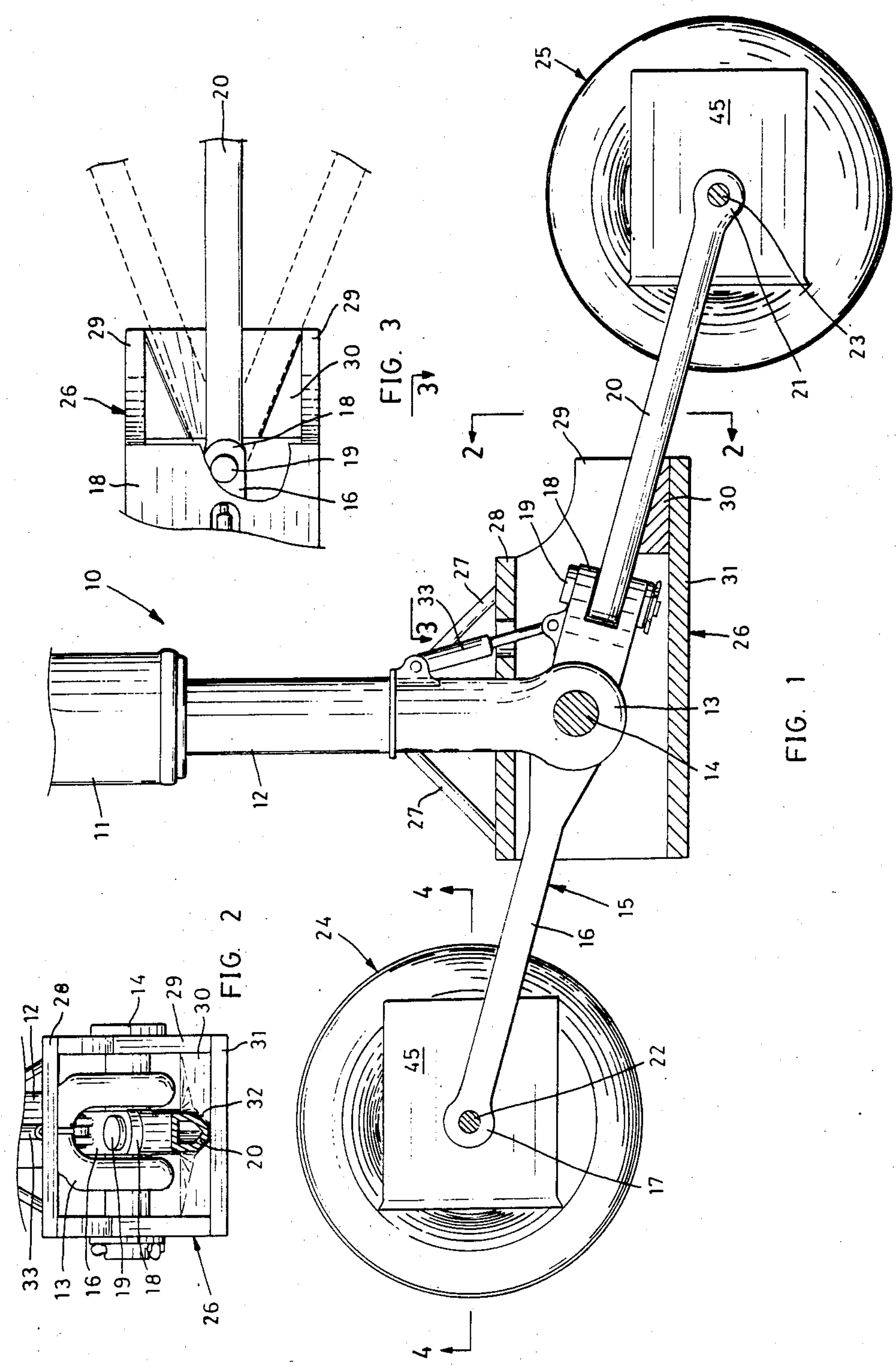
FIG. 1 is a part-sectional side view of an aircraft undercarriage truck incorporating the steering assembly.
FIG. 2 is a rear view taken on line 2—2 on FIG. 1.
FIG. 3 is a plan view taken on line 3—3 on FIG. 1.

Referring to FIG. 1, an aircraft undercarriage assembly 10 has a retractable support leg 11 provided with a telescopic strut 12 at its lower end. A yoke 13 fitted with a pivot pin 14, is provided on the strut 12 to pivotally support an undercarriage truck 15.

The truck 15 has a front axle support member 16 which is provided with a transverse axle housing 17 at its forward end and which is pivotally mounted on the pivot pin 14 adjacent its rearward end.

A yoke 18, with a substantially vertical pivot pin 19, is provided at the rearward end of the front axle support member 16 to pivotally receive the forward end of a rear axle support member 20 which also has a transverse axle housing 21 at its rearward end. Axles 22, 23 in the axle housings 17, 21 are provided with pairs of ground engaging wheels 24, 25 in a manner to be hereinafter described with reference to FIG. 4.

Referring to FIG. 2, a box-like housing 26 is mounted at the lower end of the strut 12, enclosing the yoke 13 and being supported by the pivot pin 14. Braking struts 27 interconnect the upper wall 28 of the housing to the strut.

When the aircraft is taxiing, the axle support members 16, 20 are substantially horizontal and so the rear axle support member 20 is free to pivot about the pin 19 to provide castor-like steering for the pair of rear wheels 25, the degree of steering being limited, as shown in dashed lines in FIG. 3, by the side walls 29 of the housing 26. However, in flight, the front and rear wheels 24, 25 must be aligned prior to landing.

A locking block 30 is mounted on the bottom wall 31 of the housing adjacent its rearward end and is provided with a downwardly convergent slot 32 engageable by the rear axle support member 20, a hydraulic ram 33 mounted on the strut 12 urging the rear axle support member 20 into engagement with the slot. (On landing, the ram 33 acts as a shock absorber to soften the landing and to prevent the rear wheels 25 bouncing on contact with the tarmac).

It will be readily apparent to the skilled addressee that the steering supplied to the rear wheels 25 during taxiing will reduce (or even eliminate) the "scrubbing" of the tyres during short radius turns.

Figure 4:
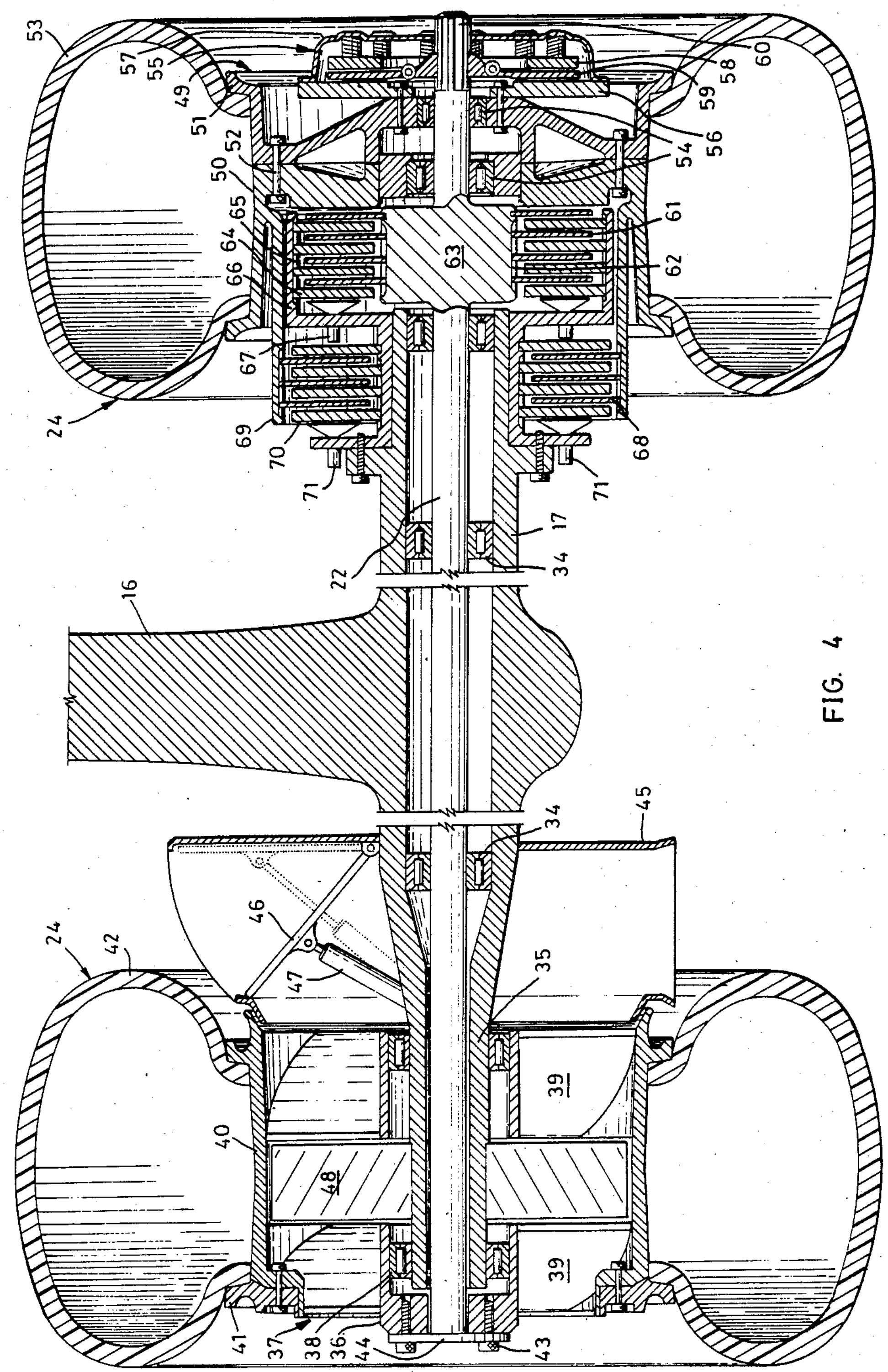
FIG. 4 is an underside sectional view of the aircraft undercarriage assembly, fitted with the braking assembly, taken on line 4—4 on FIG. 1.

Referring now to FIG. 4, the axle 22 is rotatably mounted in the axle housing 17 via suitable bearings 34. At one end, the housing 22 is tapered to a reduced diameter portion 35 which rotatably supports the hub 36 of a first front wheel assembly 37, via bearings 38. Two spaced rows of turbine blade-like spokes 39 connect the main body of the wheel rim 40 to the hub 36, a split rim 41 enabling removal of the tyre 42. Bolts 43 connect the hub 36 and an end plate 44 on the axle 22 to provide a driving connection therebetween.

An airscoop 45 of the type described in International Application No. PCT/AU82/00130 is provided adjacent the first wheel assembly 37 and the airscoop has a movable door 46, operated by a hydraulic ram 47, to direct air through the spokes 39 and a fixed stator 48, between the spokes and fixed to the reduced portion 35 of the axle housing 17, to spin the first wheel assembly 37 up to the desired speed prior to landing.

The second front wheel assembly 49 has a wheel formed with an inner- and outer rim/spoke/hub combination 50, 51 secured together by bolts 52, the wheel mounting a tyre 53. The hub portions are rotatable on bearings 54 on the axle 22 for free rotation.

A clutch assembly 55 is mounted at the end of the axle 22 and has a driven plate 56 and housing 57 mounted on the outer wheel combination 51, the housing having a spring-loaded pressure plate 58. A driving plate 59 is slidably mounted on splines 60 on the axle 22 for engagement between the pressure plate and driven plate to connect the second wheel assembly 49 to the axle 22 and first front wheel assembly 37.

When the first front wheel assembly 37 has been spun up to speed by the air passing through the airscoop 45, having only to overcome the inertia of that assembly, the clutch assembly 55 is engaged to enable the second wheel assembly 49 to also be spun up to the desired speed.

(A torque convertor or hydraulic coupling (not shown) may be substituted for the clutch assembly 55 if preferred).

A plurality of spaced brake discs 61 are slidably mounted on spaced keys 62 formed longitudinally on an enlarged portion 63 on the axle 22. The discs are interleaved between friction discs 64, slidably mounted on keys 65 provided in an annular extension 66 to the axle housing 17 adjacent the second wheel assembly 49. Spaced brake pistons 67 are operable to clamp the brake discs 61 and friction discs 64 together to apply a braking force to the axle 22 (and first front wheel assembly 37).

Similar brake discs 68 are provided on an inwardly directed annular extension 69 on the inner wheel combination 50 for engagement by friction discs 70, operated by spaced pistons 71, on the axle housing 17 to brake the second wheel assembly 49. This enables the wheel assemblies to be independently braked and for the brake assemblies to be provided on one side of the undercarriage, spaced from the airscoop 45.

The rear wheels of the undercarriage truck 15 are provided with a similar airscoop 45/braking assembly arrangement, the inclination of the undercarriage truck prior to landing, as shown in FIG. 1, ensuring both airscoops receive a clear flow of air to spin the wheels up to speed.

The embodiments described provide aircraft with undercarriage assemblies where the wheels are efficiently spun up to the desired speed prior to landing, and the front and rear wheel pairs are able to "steer" around shall radius turns, to minimise tyre wear while providing maximum safety through an efficient braking system.

At modern airports, the aircraft is positioned adjacent an aerobridge to enable the embarkation, and disembarkation, of the passengers and is pushed out to the taxiing apron by a tow vehicle or tug. To ensure that the rear pair of wheels are aligned with the front wheels before the aircraft is reversed, opposed pistons (or similar means) may be provided in the housing 26 and be operable to engage the rear axle support member 20 to align and lock the wheels as the aircraft approach the aerobridge. The pilot releases the pistons to unlock the rear axle support member to enable the rear wheels to steer prior to taxiing to the take-off point.

It will be readily apparent to the skilled addressee that the arrangement of clutch means connecting one of the wheels to the axle, and the independent braking means for the two wheels, can have applications in many other types of vehicles where tyre scrubbing through turns may be a problem.

I claim:

1. A braking assembly for aircraft or other vehicles including:

a stationary axle housing;

an axle rotatably mounted in the housing and having a hub;

a first ground-engaging wheel operatively connected to the axle, said first wheel having turbine-like spokes interconnecting a tire-mounting rim to said hub;

an airscoop mounted on the axle housing adjacent said first wheel, said airscoop directing air through the spokes to spin said first wheel;

a second ground-engaging wheel rotatably mounted on the axle;

a clutch means operable to releasably connect the second wheel to the axle to enable said second wheel to be spun up to the speed of said first wheel;

first brake means on the housing operably connectable to the axle to provide braking for the first wheel; and second brake means on the housing operably connectable to the second wheel to provide braking for the second wheel, and wherein said first and second brake means are mounted on said axle housing adjacent the second wheel, said first and second brake means including friction discs interleaved with braking discs operatively connected to the axle and second wheel, respectively, for applying braking forces to the first and second wheels respectively.

2. The braking assembly of claim 1, further comprising the aircraft undercarriage assembly including a support leg or strut extendable from an aircraft, and a stationary axle housing at or adjacent the lower end of the support leg or strut.

3. An aircraft undercarriage assembly including:

an undercarriage support strut;

a front axle support member pivotally mounted on the support strut for limited movement in the vertical plane;

a front axle, with ground-engaging wheels, on the front axle support member;

a rear axle support member privotally mounted on the front axle support member for movement about a substantially vertical axis, the rear axle support member being movable relative to the support strut in a substantially horizontal plane;

a rear axle, with ground engaging wheels, on the rear axle support member, so arranged that, during taxiing, the rear axle support member is pivotally movable to provide steering for the rear wheels relative to the front wheels but that during flight, the rear axle support member is locked relative to the front axle support member such that the rear wheels are in alignment with the front wheels; and a housing provided at the lower end of the support strut to which said strut is mounted, stop means on said housing to limit the pivotal movement of the rear axle support member relative to the front axle support member, said housing being formed with channel means at the rear of the housing for engagement by the rear axle support member to lock the rear wheels in alignment with the front wheels, and biasing means provided on the support strut and in engagement with said front axle support member to urge said rear axle support member into engagement with said channel means so as to align said front and rear wheels prior to landing.

4. An assembly as claimed in claim 3, wherein said biasing means comprises a hydraulic ram.

5. Braking and undercarriage assemblies for aircraft or other vehicles including:

a stationary axle housing;

a front axle rotatably mounted in the housing and having a hub;

a first ground-engaging wheel operatively connected to said front axle, said first wheel having turbine-like spokes interconnected between said hub and a tire-mounting rim;

an airscoop mounted on the axle housing adjacent said first wheel, said airscoop directing air through the spokes to spin said first wheel;

a second ground-engaging wheel rotatably mounted on said front axle;

a clutch means operable to releasably connect the second wheel to the axle to enable said second wheel to be spun up to the speed of said first wheel;

first brake means on the housing operably connectable to said front axle to provide braking for the first wheel;

second brake means on the housing operably connectable to the second wheel to provide braking for the second wheel, and wherein said first and second brake means are mounted on said axle housing adjacent the second wheel, said first and second brake means including friction discs interleaved with braking discs operatively connected to said front axle and said second wheel, respectively, for applying braking forces to the first and second wheels respectively;

an undercarriage support strut;

a front axle support member pivotally mounted on the support strut for limited movement in the vertical plane, said first axle being mounted on said front axle support member;

a rear axle support member pivotally mounted on the front axle support member for movement about a substantially vertical axis, the rear axle support member being movable relative to the support strut in a substantially horizontal plane;

a rear axle, with ground engaging wheels, on the rear axle support member, so arranged that, during taxiing, the rear axle support member is pivotally movable to provide steering for the rear wheels relative to the front wheels but that during flight, the rear axle support member is locked relative to the front axle support member such that the rear wheels are in alignment with the front wheels; and a housing provided at the lower end of the support strut to which said strut is mounted, stop means on said housing to limit the pivotal movement of the rear axle support member relative to the front axle support member, said housing being formed with channel means at the rear of the housing for engagement by the rear axle support member to lock the rear wheels in alignment with the front wheels, and biasing means provided on the support strut and in engagement with said front axle support member to urge said rear axle support member into engagement with said channel means so as to align said front and rear wheels prior to landing.

* * * * *